United States Patent
Bichot et al.

(10) Patent No.: US 8,341,479 B2
(45) Date of Patent: Dec. 25, 2012

(54) ROBUST FILE CASTING FOR MOBILE TV

(75) Inventors: Guillaume Bichot, La Chapelle Chaussee (FR); Vincent Alleaume, Pace (FR)

(73) Assignee: Thomson Licensing, Issy-les-Moulineaux (FR)

(*) Notice: Subject to any disclaimer, the term of this patent is extended or adjusted under 35 U.S.C. 154(b) by 603 days.

(21) Appl. No.: 12/450,379

(22) PCT Filed: Mar. 19, 2008

(86) PCT No.: PCT/EP2008/053329
§ 371 (c)(1),
(2), (4) Date: Sep. 23, 2009

(87) PCT Pub. No.: WO2008/119673
PCT Pub. Date: Oct. 9, 2008

(65) Prior Publication Data
US 2010/0050032 A1 Feb. 25, 2010

(30) Foreign Application Priority Data
Mar. 30, 2007 (EP) .................. 07300911

(51) Int. Cl.
*H04L 1/18* (2006.01)
(52) U.S. Cl. ..................... 714/748; 714/4.1
(58) Field of Classification Search ........... 714/4, 714/4.1, 714/748
See application file for complete search history.

(56) References Cited

U.S. PATENT DOCUMENTS

| 6,567,929 | B1 * | 5/2003 | Bhagavath et al. | 714/18 |
| 6,577,599 | B1 * | 6/2003 | Gupta et al. | 370/236 |
| 6,782,490 | B2 * | 8/2004 | Maxemchuk et al. | 714/18 |
| 7,376,150 | B2 * | 5/2008 | Vedantham et al. | 370/469 |
| 7,590,922 | B2 * | 9/2009 | Vedantham et al. | 714/776 |
| 2003/0126514 | A1 | 7/2003 | Shabbir Alam et al. | |
| 2006/0069802 | A1 | 3/2006 | Vedantham et al. | |

FOREIGN PATENT DOCUMENTS

WO WO 2005/093998 10/2005
WO WO 2006/123212 11/2006

OTHER PUBLICATIONS

Hwa-Chun Lin et al.: "Placement of repair servers to support server-based reliable multicast" 20010611; 20010611-20010614, vol. 6, Jun. 11, 2001, pp. 1802-1806 XP010553178.
Search Report Dated Aug. 12, 2008.

* cited by examiner

*Primary Examiner* — Esaw Abraham
(74) *Attorney, Agent, or Firm* — Myers Wolin, LLC

(57) ABSTRACT

Disclosed are a repair control device and a method at the repair control device for selecting a repair server among a plurality of repair servers, in a system where at least one terminal and the plurality of repair servers listen to at least one file delivery session distributed in a push mode from at least one file server. The method includes the steps of receiving from at least one terminal a request for repairing a packet of the at least one file delivery session, selecting a repair server among a plurality of repair servers for repairing the packet to the at least one terminal and redirecting the request to the at least one terminal with the address of the selected repair server or forwarding the request to the selected repair server.

7 Claims, 4 Drawing Sheets

ROBUST FILE CASTING FOR MOBILE TV

This application claims the benefit, under 35 U.S.C. §365 of International Application PCT/EP2008/053329, filed Mar. 19, 2008, which was published in accordance with PCT Article 21(2) on Oct. 9, 2008 in English and which claims the benefit of European patent application No. 07300911.0, filed Mar. 30, 2007.

FIELD OF THE INVENTION

The present invention relates generally to content distribution and in particular to a method and device for providing an efficient repair mechanism.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Watching TV programs on Mobile terminals has been possible for a while now through a cellular network. The broadcast protocols as defined in DVB-H enhance the quality of service and the possibilities in term of business services. Mobile TV trials and first commercial activities focus on the classic live TV service.

A push file delivery service may be built on the top of a mobile broadcast network such as DVB-H and a bidirectional network such as the cellular 3G network. One advantage of a file based video delivery service is the relative flexibility over network issues such as bandwidth constraint and packet loss.

The push video on demand (VOD) service transmits video files over the broadcast multicast network (e.g. DVB-H) to an end-user device according to a smart scheduling based on a number of criteria that include among others priorities, user subscription, network status (measuring for instance bandwidth availability), dynamic content classification, schedule history. These files which match the user's preferences are saved to a local storage on the end-user device. This enables the user to access a wide variety of content without playback delay and with little concern for the underlying delivery mechanism. DVB-H is defined in the standards "ETSI EN 301 192 V1.4.1 (2004-11) Digital Video Broadcasting (DVB); DVB specification for data broadcasting" and "ETSI EN 302 304 V1.1.1 (2004-11) Digital Video Broadcasting (DVB); Transmission System for Handheld Terminals (DVB-H)".

A mobile broadcast network is a unidirectional network where packet losses can be partially solved through the use of an application forward error correction (FEC). However using a FEC mechanism is bandwidth consuming and does not guarantee a fully recovered file. This is particularly true with a wireless mobile broadcast network where a terminal may miss large pieces of data when the user moves into poorly covered areas like tunnels. Moreover, in current DVB-H receiver implementations, according to the standard "ETSI TR 102 377 V1.1.1 (2005-02) Digital Video Broadcasting (DVB); DVB-H Implementation Guidelines", if a burst of packets that includes several IP packets cannot be entirely repaired using FEC, it is ignored. Several important IP packets may then be lost.

Another technique for avoiding packet loss consists in sending a same file several times. It may be well suited to short files like Electronic Service Guide containers as specified for example in the standard "DVB-IPDC ESG, ETSI TS 102 471 V1.2.1 (2006-09), Digital Video Broadcasting (DVB); IP Datacast over DVB-H: Electronic Service Guide (ESG)". But it is obviously a less efficient mechanism for video file delivery.

File repair or robust file casting is another method to guarantee the integrity of a video file transmitted over the air. It is especially well suited for a push VOD service enhancing the user viewing experience.

Post delivery file repair protocol is described in the standard "ETSI TS 102 472 V1.2.1 (2006-12), Digital Video Broadcasting (DVB); IP Datacast over DVB-H: Content Delivery Protocols" produced by the third Generation Partnership Project, Multimedia Broadcast Multicast Service group (3GPP-MBMS). It is also described in the standard "ETSI TS 126 346 V6.1.0 (2005-06), Universal Mobile Telecommunications System (UMTS); Multimedia Broadcast/Multicast Service (MBMS); Protocols and codecs (3GPP TS 26.346 version 6.1.0 Release 6)" produced by the Digital Video Broadcasting-Convergence Broadcast Multicast System group (DVB-CBMS). The file repair mechanism is part of the so-called associated delivery procedures; the main procedure being file delivery based on the FLUTE protocol suite, specified in the RFC 3926—File Delivery over Unidirectional Transport (FLUTE). The goal of the file repair protocol is to provide a way to retrieve the missing packets and/or pieces of a file previously received according to the file delivery procedure.

The file repair procedure starts whenever a file is supposed to have been fully received. It is quite difficult in FLUTE to detect the end of a file. The last FLUTE packet of a file may be marked to signal the end of a file. However if this packet is missing, the receiver must rely on the File Delivery Table (FDT). The FDT is a set of information about files to be sent in band as part of the FLUTE protocol. Such information optionally contains the size of the file. Nevertheless DVB-CBMS, according to the RFC 3926, recommends using the FDT transfer length parameter that indicates the file size currently transported over the FLUTE protocol. Once the file is supposedly received, a receiver detects the missing FLUTE packets, establishes a connection with a repair server. According to a back-off algorithm, it sends one or more requests at the right time and gets the missing packets and saves the fully reconstituted file.

This mechanism can be combined with an application FEC like the raptor-code recommended by DVB-CBMS. The receiver requests only the packets necessary to run the FEC decoding process with success.

However the FDT may not be received by a receiver. Moreover, size information is present in the FLUTE packet header as a mandatory extension header gathering FEC delivery information including the transfer length. And it is not mandatory to deliver the header extension in each FLUTE packet. Finally, a watchdog timer may be used to securely close a file if none of the previous information has been detected by the receiver. It has to be used cautiously as the elapsed time between two packets is not constant.

SUMMARY OF THE INVENTION

The present invention attempts to remedy at least some of the concerns connected with file repair in the prior art, by providing a repair gateway that perform the selection of the repair server that better fits the requesting device.

The present invention concerns a method at a repair control device for selecting a repair server among a plurality of repair servers, in a system where at least one terminal and the plurality of repair servers listen to at least one file delivery session distributed in a push mode from at least one file server.

To this end, the method comprises the steps of receiving from the at least one terminal a request for repairing a packet of the at least one file delivery session, selecting a repair server for repairing the packet to the at least one terminal and redirecting the request to the at least one terminal with the address of the selected repair server.

The file repair mechanism is based on a point-to-point protocol that allows any receiver to repair a file previously received through the one way broadcast network. The solution extends the possibilities of the DVB-IPDC and 3GPP-MBMS post delivery file repair mechanism enhancing robustness and scalability. The method of the invention provides a centralized control of the repair procedure that improves the efficiency of the repair procedure by providing the best repair server at the time the request is sent. This is well adapted to a network comprising a plurality of repair servers spread out in a large network.

According to an embodiment, the method comprises the step of redirecting a subsequent request for repairing a packet of the at least one file delivery session from the terminal to the selected repair server.

The present invention also concerns a method at a repair control device for selecting a repair server among a plurality of repair servers, in a system where at least one terminal and the plurality of repair servers listen to at least one file delivery session distributed in a push mode from at least one file server.

To this end, the method comprises the steps of receiving from the at least one terminal a request for repairing a packet of the at least one file delivery session, selecting a repair server for repairing the packet to the at least one terminal and forwarding the request to the selected repair server.

According to an embodiment, the method comprises the step of forwarding a subsequent request for repairing a packet of the at least one file delivery session from the terminal to the selected repair server.

According to an embodiment, the repair servers are of a first type or a second type, where a repair server of a first type correctly receives only part of the packets transmitted by the file server, and a repair server of a second type correctly receives all the packets transmitted by the file server. The step of selecting comprising the steps of classifying the repair servers of the first type, successively, from the first to the last repair server of the classification, sending a request for repairing a packet, until receiving a response with an indication on the percentage of reparation the repair server can ensure, where the percentage meets a threshold, if a repair server meets the threshold, selecting the repair server, and if the last repair server of the list does not provide a percentage that meets the threshold, selecting a repair server of a second type.

According to an embodiment, the repair controller classifies the repair servers from the least loaded to the most loaded.

According to an embodiment, the repair controller selects the repair server of the second type that is the closest to the requesting device.

According to an embodiment, the file delivery session is a File Delivery over Unidirectional Transport session.

According to an embodiment, the step of selecting comprises the steps of deciding on using a multicast repair and selecting a repair server of the second type.

The invention also concerns a repair control device, comprising communicating means for communicating to more than one repair server, and to at least one terminal, in a system where the more than one repair server and the at least one terminal listen to at least one file delivery session distributed in a push mode from at least one file server, selecting means for, on reception of a repair request from the at least one terminal, selecting a repair server among the more than one repair server for repairing the packet to the at least one terminal, and redirecting means for redirecting a request received from a terminal for repairing a packet to the repair server or for forwarding the request to the repair server.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIG. 3, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

The exemplary embodiment comes within the framework of video broadcasting in a DVB-H architecture, but the invention is not limited to this particular environment and may be applied within other frameworks where a server is to be selected over a plurality of servers.

Figure 1:
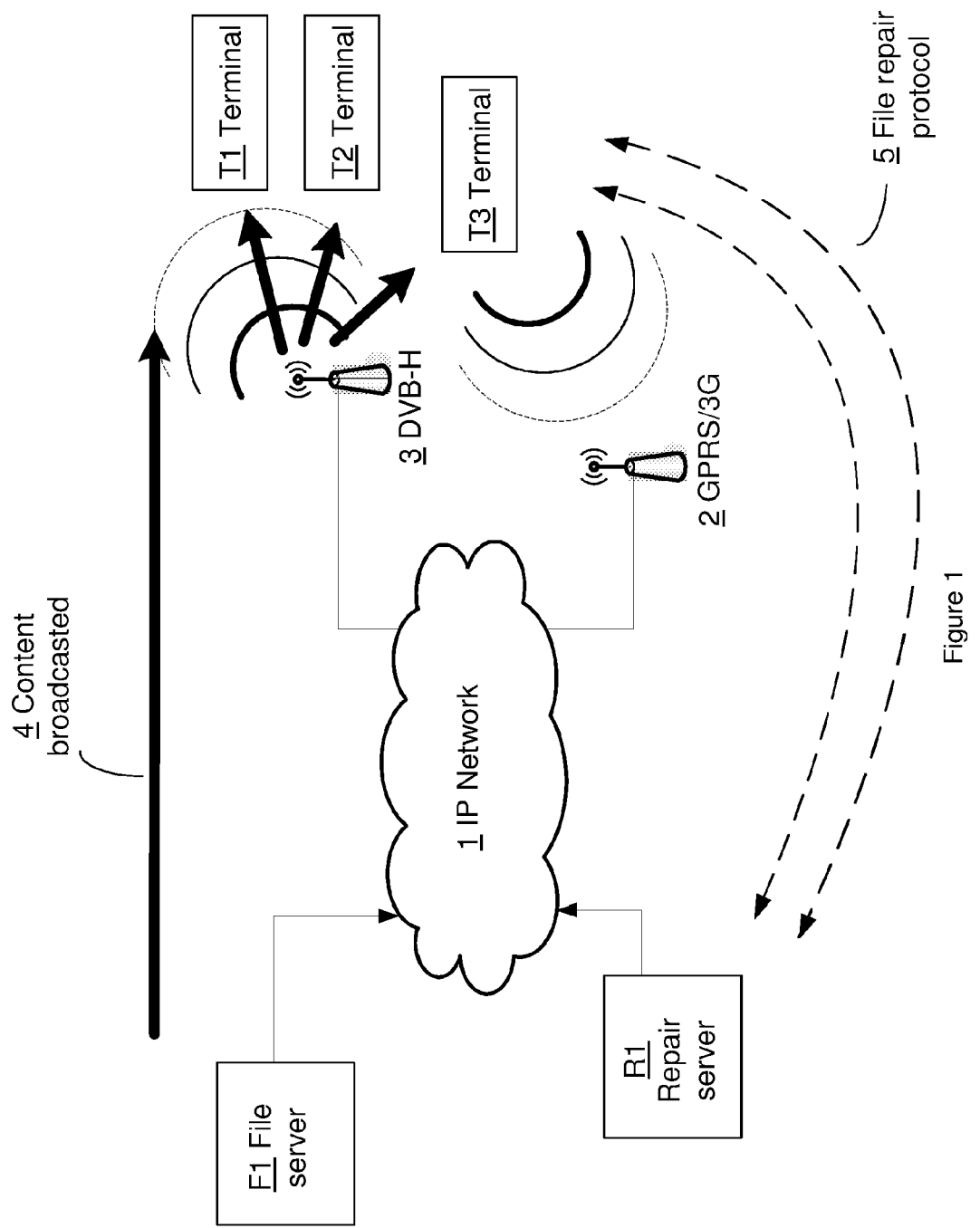
FIG. 1 illustrates a block diagram of a system with a single server.

A system with a single server is depicted in FIG. 1. It conforms to the standard "ETSI TS 102 472 V1.2.1 (2006-12)—Digital Video Broadcasting (DVB); IP Datacast over DVB-H: Content Delivery Protocols". Content is broadcasted (4) over the IP network (1) and the DVB-H network (3) to the DVB-H terminals (T1, T2, T3). The terminals requests missing files (5) to the repair server (R1) through the 3G network (2) that conforms to the GPRS standard. The repair server (R1) is transparent to the file server (F1). The repair server listens to outgoing UDP traffic and is supposed to be reliable. The repair server may reside within the file server host. The repair server may be multi channel, i.e. it may listen to several ALC channels associated with a FLUTE session, the ALC being defined in RFC 3450—Asynchronous Layered Coding (ALC) Protocol Instantiation.

A FLUTE session corresponds to a file delivery session. It is identified by the Transport Session Identifier (TSI) and the source IP address of the file server. The TSI is indicated in each FLUTE packet. The repair server may be dedicated to listen to a unique session or can be multi-session, i.e. it can listen to several sessions in parallel.

When requesting reparation, the terminal uses the Uniform Resource Identifier (URI) of the file to be repaired. However this URI might not be known by the receiver; the FDT that carries the association between a URI and the corresponding FLUTE transport identifier may be lost. According to the embodiment, the file to be repaired may be uniquely identified during the file repair period that follows the broadcast of the file using the Transport Object Identifier (TOI) for an ongoing session. The TOI is a FLUTE protocol suite identifier embedded into the FLUTE packet header. This identifier may be reused at different times during the FLUTE session's life time (as a transport object identifier linked to a different URI. At a time this identifier is uniquely associated to a valid URI through a FDT instance, within a FLUTE session that is itself identified thanks to the Transport Session Identifier (TSI) and the source address IP of the sender (i.e. the file server).

The FDT carries important information linked with the files to be delivered including the URI of the file. It is used by the receiver to store, classify or process the file accordingly. If the FDT has been partially received, it may happen that the terminal cannot find any associated FDT information with the received file. Although it can repair the file using the FLUTE identifiers as explained hereinabove and could store it according to a private naming scheme, it is useful to get the missing FDT information for a more conventional naming process. According to the embodiment, the repair request has been extended in such a way that the terminal can request the FDT or at least the partial FDT linked with a file identified with the couple TSI/TOI. Of course an optimized request gathers the TSI/TOI for identifying the file, the list of FLUTE packets to be repaired and the indication to get simultaneously the associated partial FDT.

The current DVB-CBMS file repair protocol specifies that the client requesting reparation sends the FEC-Payload ID corresponding to each FLUTE packet to be repaired. It is composed of the Source block Number (SBN) and the Encoding Symbol ID (ESI). The repair server sends back in its response the set of requested payload chunks, each prefixed with the so-called FEC payload ID. This forces the client to process the incoming repaired packet as non FLUTE packets or it forces the client to recompose the FLUTE packet that is not an easy task. According to the embodiment, the repair server may return, on client request, the full FLUTE packet instead of the payload part only. This simplifies the implementation on the client side as the repaired FLUTE packets can be re-injected in the reception process as they are incoming from the DVB-H interface.

Figure 2:
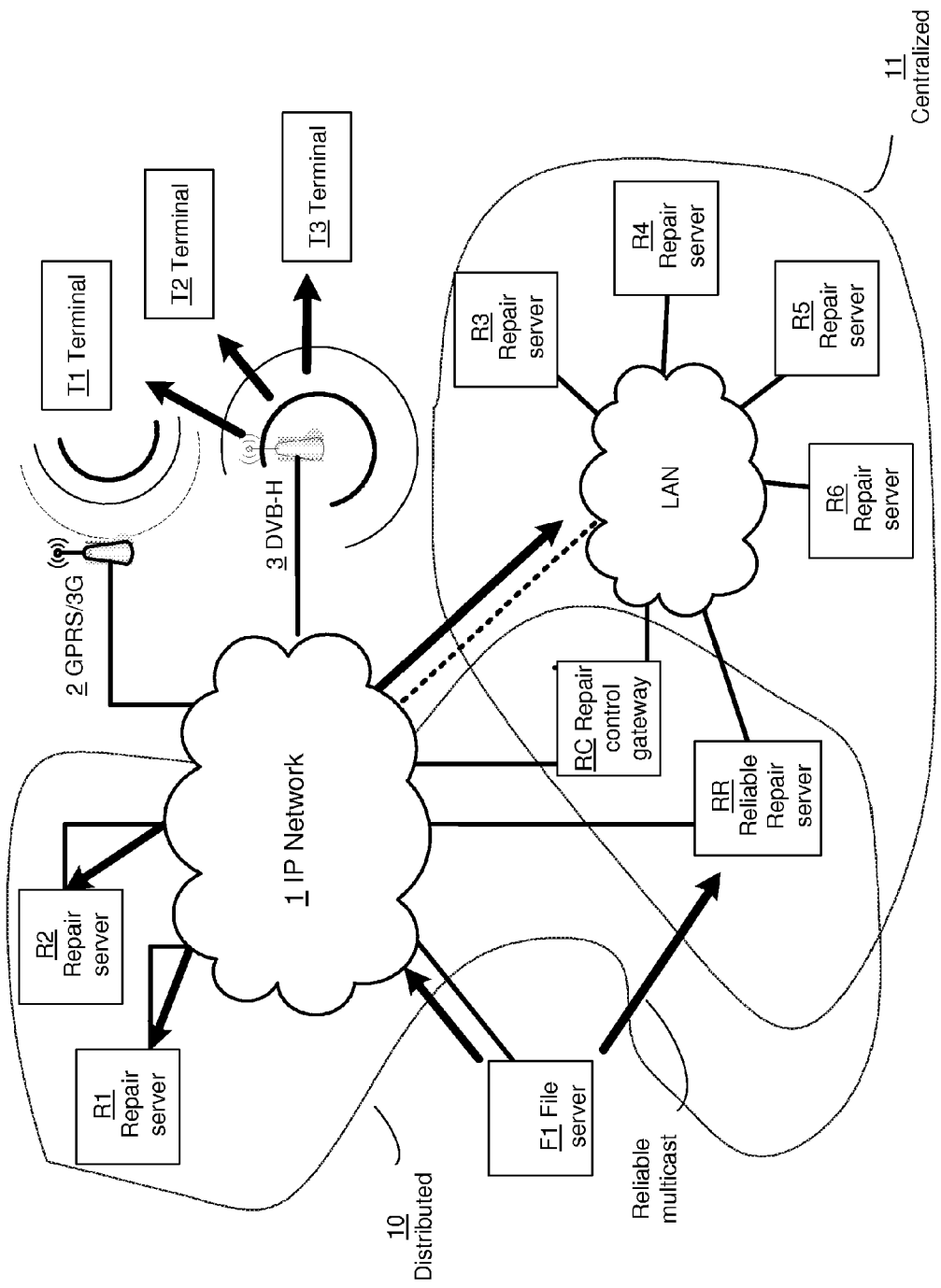
FIG. 2 illustrates a block diagram of a multi-server architecture according to the embodiment.

The multi-server architecture is shown in FIG. 2. It aims at providing scalability to the single server system. It comprises a file server (F1) that broadcasts or multicasts files according to the FLUTE multicast delivery protocol.

It comprises at least one reliable repair server (RR) linked to the file server through a reliable connecting means. Reliable connecting means are means that provide very low error rate or an error rate equal to zero. A reliable repair server listens to multicast traffic and simultaneously builds its internal files database. The reliable repair server gets all the traffic without any error. The reliable repair server and the file server are represented in different entities. Of course they might be located inside the same physical entity.

The architecture also comprises a set of non reliable repair servers (R1, R2, R3, R4, R5, R6), called hereinafter repair servers. They catch the files broadcasted by the file server. They are non reliable in the sense that they receive packets with losses and errors. Consequently they may need to repair their own files using the file repair protocol as any other client terminal.

Content is broadcasted over the IP network (1) and the DVB-H network (3) to the DVB-H terminals (T1, T2, T3). The terminals requests missing files to the repair controller (RC) through the 3G network (2) that conforms to the GPRS standard.

The multi-server architecture comprises a repair control gateway (RC) that is, basically, an HTTP server front-end for the system. It receives and analyses the repair requests coming from a client terminal. It decides on the repair strategy according to the repair server infrastructure. In the single server system described hereinabove, the repair control gateway and the reliable repair server could be packaged together. In the multi-server architecture, the repair control gateway might be comprised in one of the repair servers. Alternatively the repair control gateway might be collocated with a client terminal. In general, the repair controller regularly polls the servers to check which one is active or inactive, and to check the CPU load of each server.

According to the embodiment, two topologies are supported.

The server farm infrastructure (11), also called the centralized infrastructure, comprises a set of repair servers connected together through a LAN. The server farm is controlled by the repair control gateway and can possibly be also directly interconnected with the clients. The repair control gateway selects a repair server according to a loading criterion similar to the one used by web farm controllers for performing DNS based load balancing.

The distributed infrastructure (10) is a set of repair servers that are distributed along a large zone in order to offer the most efficient response time.

The repair control gateway, also called the repair controller, is the head-end of the system infrastructure. Its address for request submitting is the only information that is well known by the terminals. When a terminal needs to repair a file, it sends a repair request to the repair controller. The repair controller can deal with the two topologies described hereinabove, the server farm and the distributed network.

In case of a distributed network, the repair controller forwards the request to the repair server that is the closest to the terminal. The forwarding is based on HTTP redirect where the repair controller sends back to the client a HTTP redirect command as the repair response. The HTTP redirect is defined in the RFC1945 on HTTP 1.0 and RFC2616 on HTTP 1.1. On reception of an HTTP redirect, the client automatically issues a new HTTP request to the repair server indicated in the HTTP redirect. This repair server responds to the request according to the repair protocol.

In case of a server farm, the repair controller forwards the request to the repair server that is the less loaded of the farm. The request is directly forwarded to the repair server. The chosen repair server can serve the request according to the repair protocol. Requests and responses always go through the repair controller.

According to the embodiment, the repair controller may select a server not only because it is less loaded or close to the terminal that sends the request. It may also select the server that can guarantee a certain percentage of reparation associated with a particular request. The percentage of reparation is a configuration parameter of the repair controller. Among the set of repair servers, there is still a server that is considered to be the most reliable. The other servers may have partially caught the complete traffic coming out from the file server due to packet losses.

Figure 4:
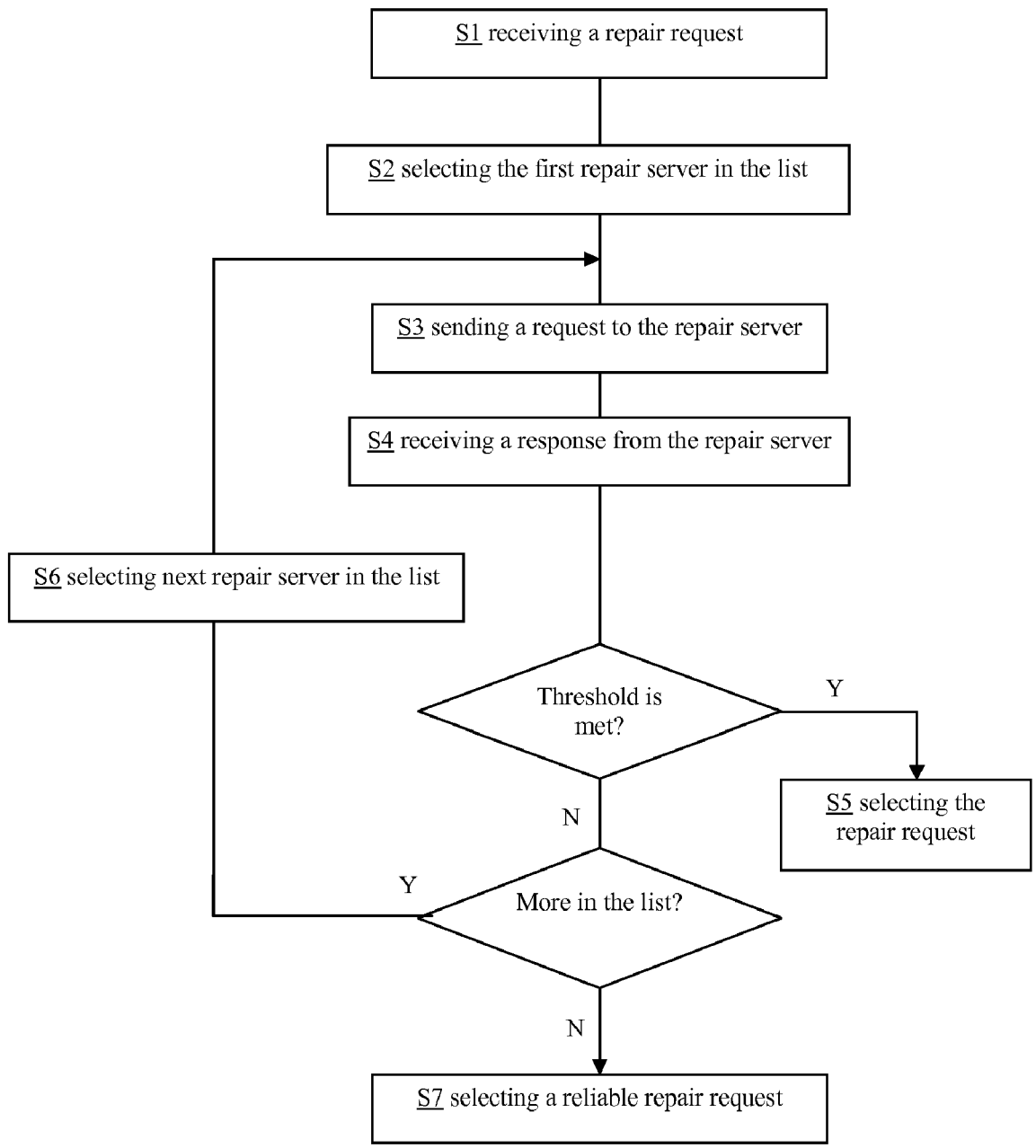
FIG. 4 represents a flow chart of the selection method according to the embodiment.

The selection of the server is performed as follows, as illustrated in FIG. 4. The terminal sets up a TCP connection with the repair controller. It sends an HTTP repair request to the repair controller, S1. At steps S2, S3, the repair controller modifies the request. It changes the name of the request in order to indicate that the request is used for checking whether reparation is possible with that repair server. That request is not used for repairing. Then it forwards the request to the closest repair server (when in a distributed network) or to the least loaded server (when in a server farm). In another word, the repair controller builds a list of repair servers, and classifies the repair servers of the list according to the criteria depending on the network type; in a server farm the ranking is based on the server load.

On reception of the request, the repair server analyzes the request and sends back an answer S4 to the repair controller indicating the level of reparation it can ensure. This level of reparation can be estimated based on several parameters such as:

The percentage of file that the repair server can repair (corresponding to the data available in the associated local database), The percentage of reparation corresponding to the received request.

The repair controller uses these parameters to decide whether it maintains its choice or not, based on thresholds.

If the repair server answer does not satisfy the repair controller then the repair controller tries another repair S6 server to check if it would offer a better reparation ratio.

If that selection process does not successfully provide a repair server, the repair controller chooses one of the reliable repair servers S7 using possibly the load criteria.

In other words, the terminal requests a certain number of packets of a file to be repaired. On reception of the request, the repair controller sends a request to a repair server to know if the server is able to provide the packets. On reception of the request, the server checks the number of packets available. The percentage is the number of packets available over the number of packets requested. The repair controller sets up a threshold. If the percentage is below the threshold, the repair controller sends the request to another server. If the percentage is above the threshold, the server is selected. Preferably the threshold is set to a value of 40%.

The HTTP repair request length is limited. It may be limited to a value of 256 bytes. If the terminal requests a large amount of data, a single request is not sufficient, and the terminal successively sends several sub-requests into the same session. In that case, the repair controller performs the selection of the server based on the first request of the series of sub-requests. The repair server then sends a response to each sub-request.

Once the repair server is chosen, the behavior of the repair controller depends on the infrastructure. In the case of the server farm, there are two possibilities.

In a first possibility, the server farm is not connected directly to the client's network. The repair controller forwards the request to the chosen repair server, not for checking purpose but for processing purpose. The repair server processes the request and sends back its answer to the repair controller that forwards it back to the terminal and so on.

In a second possibility, the server farm is connected directly to the client's network. On reception of a repair request, the repair controller sends back to the client a HTTP redirect command. That command gathers the chosen repair server address. On reception of the HTTP redirect, the client automatically sends the HTTP request to the repair server at the address indicated in the HTTP redirect. The repair server sends back to the client the repair packets and so on.

In case of a distributed infrastructure only the second possibility applies.

The distributed infrastructure may be combined with the server farm infrastructure. The combined infrastructure comprises a set of distributed "stand alone" and "farm" servers. The controller then uses a more complex heuristics based on the location of the server (or the server farm) and the level of loading of each individual repair server.

According to the embodiment, the repair gateway also comprises a unicast-multicast module. This module is adapted to switch the repair mode from unicast distribution mode to multicast distribution. As described hereinabove, the gateway redirects the terminal to a repair server, or forwards the request to a repair server. This is a unicast mode.

In a manner compliant to ETSI TS 126 346, the gateway may redirect the terminal to a broadcast/multicast delivery. When switching to multicast, the gateway preferably selects a reliable repair server that will provide repair data to be broadcasted through that multicast delivery.

Figure 3:
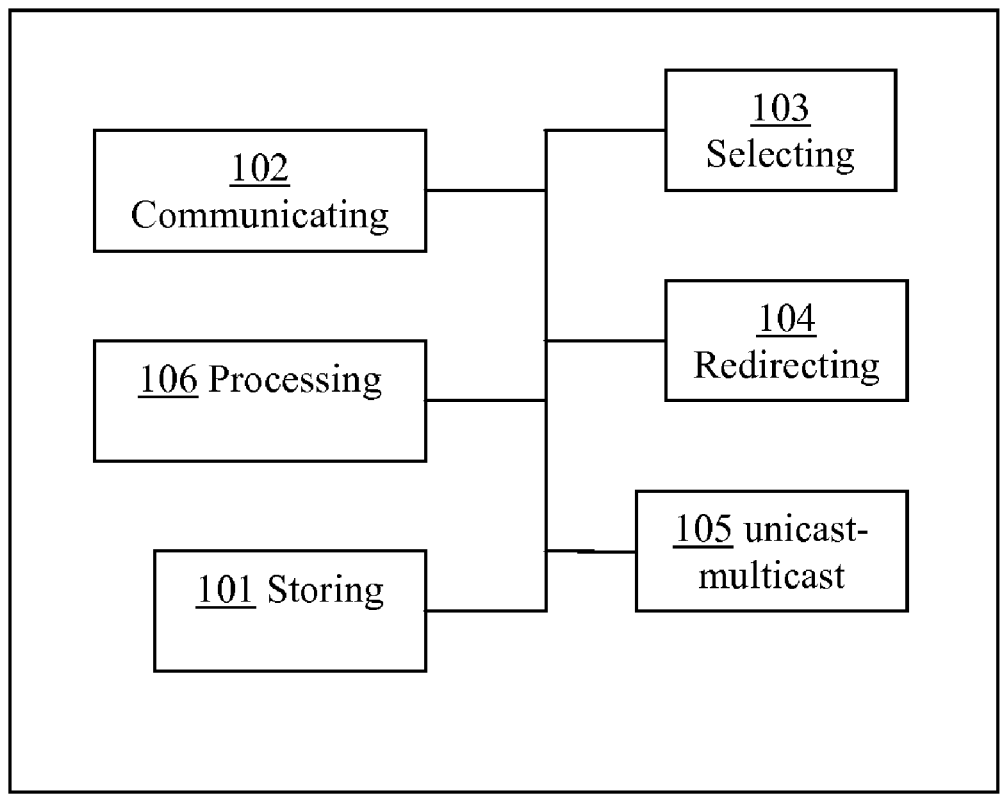
FIG. 3 represents a block diagram of a repair controller according to the embodiment.

The repair control gateway RC is illustrated in FIG. 3. It comprises communicating means 102 for connecting to the Internet. Of course the repair controller could connect to any other type of network that permits to connect to the repair servers and the terminals. Communicating means enable the gateway to communicate with the terminals and with the repair servers.

It comprises redirecting means 104 for redirecting a request from a terminal to the address of a repair server. According to the embodiment, the redirecting means are compliant with HTTP redirect as described hereinabove.

It comprises selecting means 103 for selecting the repair server in a manner as described hereinabove.

It comprises a unicast-multicast module 105 for performing the switching between unicast and multicast modes as described hereinabove.

It comprises storing module 101, in the form of a memory, for storing the list of repair servers of the architecture.

It comprises a processing module 106, in the form of a processor.

The repair control gateway could be collocated with a computer device. Of course the repair control gateway could also be any standalone device that comprises the functional module as described herein.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. Method at a repair control device for selecting a repair server among a plurality of repair servers, in a system comprising said repair control device, said plurality of repair servers and at least one file server, where at least one terminal and said plurality of repair servers listen to at least one file delivery session distributed in a push mode from at least one file server, said method comprising, at said repair control device:

receiving from said at least one terminal a request for repairing a packet of said at least one file delivery session, successively sending requests to said plurality of repair servers according to a predetermined criterion to identify if a repair server is capable of repairing said packet, and if a repair server is capable of repairing said packet, indicating to said at least one terminal the address of said repair server capable of repairing said packet, or forwarding said request to said repair server capable of repairing said packet.

2. Method according to claim 1, wherein said repair servers are either of a first type or of a second type, where a repair server of a first type correctly receives only part of the packets transmitted by said file server, and a repair server of a second type correctly receives all the packets transmitted by said file server, the successively sending requests comprising:

successively sending, to each one of said repair server of the first type, a request for repairing a packet, until receiving a response with an indication that a repair server is capable of repairing said packet.

3. Method according to claim 1, if no repair server of the first type is capable of repairing said packet, selecting a repair server among said repair servers of a second type.

4. Method according to claim 1, wherein said repair control device performs successively sending requests to said plurality of repair servers from the least loaded repair server to the most loaded repair server.

5. Method according to claim 1, wherein said repair control device performs successively sending requests to said plurality of repair servers from the closest repair server to the furthest repair server.

6. Method according to claim 1, wherein the at least one file delivery session is a File Delivery over Unidirectional Transport session.

7. A repair control device, comprising:
a non-transitory memory; and
a processor configured to cause the execution of:
communicating to more than one repair server, and to at least one terminal, in a system where said more than one repair server and said at least one terminal listen to at least one file delivery session distributed in a push mode from at least one file server,
selecting said repair server, on reception of a repair request from said at least one terminal, by successively sending requests to said repair servers to identify if a repair server is capable of repairing said packet, and
indicating to said at least one terminal the address of said repair server capable of repairing said packet or for forwarding said request to said repair server capable of repairing said packet.

* * * * *